United States Patent
Price et al.

(10) Patent No.: US 6,401,816 B1
(45) Date of Patent: Jun. 11, 2002

(54) EFFICIENT METHOD FOR SUBSURFACE TREATMENTS, INCLUDING SQUEEZE TREATMENTS

(75) Inventors: Ronald R. Price, Stevensville, MD (US); Robert David Eden, Manchester (GB); Bruce P. Gaber, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/518,133

(22) Filed: Mar. 3, 2000

Related U.S. Application Data

(60) Provisional application No. 60/122,967, filed on Mar. 3, 1999.

(51) Int. Cl.[7] .............................................. A01N 25/08
(52) U.S. Cl. ...................................... 166/279; 166/310
(58) Field of Search ................................ 166/279, 300, 166/305.1, 310

(56) References Cited

U.S. PATENT DOCUMENTS

| | | |
|---|---|---|
| 5,492,696 A | 2/1996 | Price et al. |
| 5,651,976 A | 7/1997 | Price et al. |
| 6,135,207 A * | 10/2000 | Zaid et al. ................... 166/309 |

\* cited by examiner

Primary Examiner—William Neuder
(74) Attorney, Agent, or Firm—John J. Karasek; Jane Barrow

(57) ABSTRACT

A method for delivering encapsulated materials to a subsurface environment, for the treatment of the subsurface environment, has the steps of: (a) loading the lumen of hollow microtubules with an active agent selected for treating the subsurface environment, where the hollow microtubules are compatible with the subsurface environment; and (b) administering the hollow microtubules to the subsurface environment, permitting the controlled release of the active agent into the subsurface environment. This method may be practiced using a slurry of hollow microtubules, where the lumen of these microtubules is loaded with an agent for the treatment of petroleum well environments, and where these loaded microtubules are dispersed in a liquid phase carrier selected from aqueous carriers, non-aqueous carriers, and emulsions of aqueous and non-aqueous materials. This method may also be practiced using a pill made of a consolidated mass of tubules loaded with one or more active agents, typically bound with a binder.

19 Claims, 2 Drawing Sheets

EFFICIENT METHOD FOR SUBSURFACE TREATMENTS, INCLUDING SQUEEZE TREATMENTS

This application claims priority from provisional application Ser. No. 60/122,967, filed Mar. 3, 1999.

BACKGROUND OF THE INVENTION

1. Field of the Invention

The present invention relates generally to treating subsurface liquid reservoirs, particularly oil reservoirs. More particularly, this invention relates to treating these reservoirs to prevent and/or remedy such problems as fouling of extraction wells by scale formation, well corrosion, and souring of oil by bacterial contamination. This invention further relates to treating the liquid in these reservoirs by introducing chemical or biological agents, to affect the properties of the liquid or to aid in the extraction of the liquid.

2. Description of the Related Art

Referring to FIG. 1, a typical undersea oil reservoir has the following morphology. Under the seafloor 10 and a rock dome 12, an oil reservoir 14 is found, usually between a high pressure gas pocket 16 and a layer of water 18.

When a new well is drilled in such a reservoir, oil typically flows spontaneously out of the reservoir as a "gusher", due to the high pressure the oil is under. However, as the well matures and the pressure in the reservoir abates, the gusher subsides and the oil can be recovered only by pumping.

Recovery by pumping, besides being inherently more complex and expensive than getting oil from a gusher, creates several additional problems. Referring to FIG. 2, because water is significantly less viscous than oil, pumping tends to draw the water layer 18 up. This "coning" results in a significant amount of water being pumped to the surface. This water cone can even act as a barrier to the oil, forming an immiscible wall between the oil and the well borehole.

The water in an oil reservoir typically contains a large amount of various dissolved salts (e.g., barium sulfate). When the well water leaves the high pressure, high temperature (about 200° C.) environment of the reservoir, and travels up the borehole to the ocean floor where the temperature is much lower, these salts tend to precipitate out of the liquid, and deposit on the pipewall as scale. Over time this scale builds up, occluding the well. Periodically, this scale must be removed, typically by the application of an anti-scale agent, applied in a "squeeze" treatment. These squeeze treatments require shutting down the well for some time, at great expense. After the squeeze treatment, the scale begins to build up again within a short amount of time, necessitating another squeeze treatment within a few months.

Another problem faced during oil recovery is souring, the reduction of sulfates to sulfides in the reservoir oil. This is caused by the introduction of sulfophilic bacteria in the reservoir. Sulfides are highly caustic, and tend to damage well equipment. Sulfides are also extremely environmentally unfriendly, and therefore are undesirable in the recovered oil. Anti-souring agents, especially biocides, are used to control this problem. However, many of these biocides are hydrophilic, and are therefore difficult to introduce into the hydrophobic oil where these bacteria are found.

Other reasons for treating oil in underground reservoirs are known, and other agents for treating underground oil for these reasons are likewise known. For instance, it is sometimes desired to introduce an oxidant into the reservoir somewhat remotely from the extraction well, so that remote combustion can push oil towards the extraction well. Also, because pumping energy requirements increase with the viscosity of the pumped oil, it would be advantageous to treat oil in an underground reservoir to reduce its viscosity.

It would be advantageous to microencapsulate these and other chemical and biological agents for treating oil in subterranean reservoirs, to provide controlled release for any of these purposes. However, pumping places a great deal of stress on microencapsulants, stress that will rupture most microencapsulants. Likewise, the reservoir itself is a very hostile environment, with extremely high pressures, fairly high temperatures, and incredibly caustic chemistries. Moreover, a fully successful encapsulant would need to be compatible with the desired deployment phase, whether the aqueous or non-aqueous phase. Optimally, a single microencapsulant would be adaptable to either environment. Finally, the time scale for release from the microencapsulant should be compatible with the desired treatment protocol. To date, a fully successful microencapsulation scheme for treating oil in subterranean reservoirs has yet to be proposed.

SUMMARY OF THE INVENTION

Accordingly, it is an object of this invention to provide long-term treatment systems compatible with various well environments, including water well environments, but especially including petroleum well environments.

It is a further object of this invention to provide long term treatment systems for petroleum well environments, where the treatment includes micro-encapsulation of active agents for delivery to the well environment.

It is a further object of this invention to provide long term anti-souring treatment systems for petroleum well environments.

It is a further object of this invention to provide long term treatment systems for petroleum well environments for preventing scale buildup, on pipe walls and elsewhere in the well.

It is a further object of this invention to provide long term treatment systems for petroleum well environments for preventing the "coning" of a water layer under an oil reservoir during pumping.

These and additional objects of the invention are accomplished by the structures and processes hereinafter described.

An aspect of the present invention is a method for delivering encapsulated materials to a subsurface environment, for the treatment of the subsurface environment, having the steps: (a) loading the lumen of hollow microtubules with an active agent selected for treating the subsurface environment, wherein the hollow microtubules are compatible with the subsurface environment; and (b) administering the hollow microtubules to the subsurface environment, thereby permitting the controlled release of the active agent into the subsurface environment.

Another aspect of the invention is a slurry of hollow microtubules, where the lumen of these microtubules is loaded with an agent for the treatment of petroleum well environments, and where these loaded microtubules are dispersed in a liquid phase carrier selected from aqueous carriers, non-aqueous carriers, and emulsions of aqueous and non-aqueous materials.

Another aspect of the invention is a pill comprising a consolidated mass of tubules loaded with one or more active agents, typically bound with a binder.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

Figure 1:
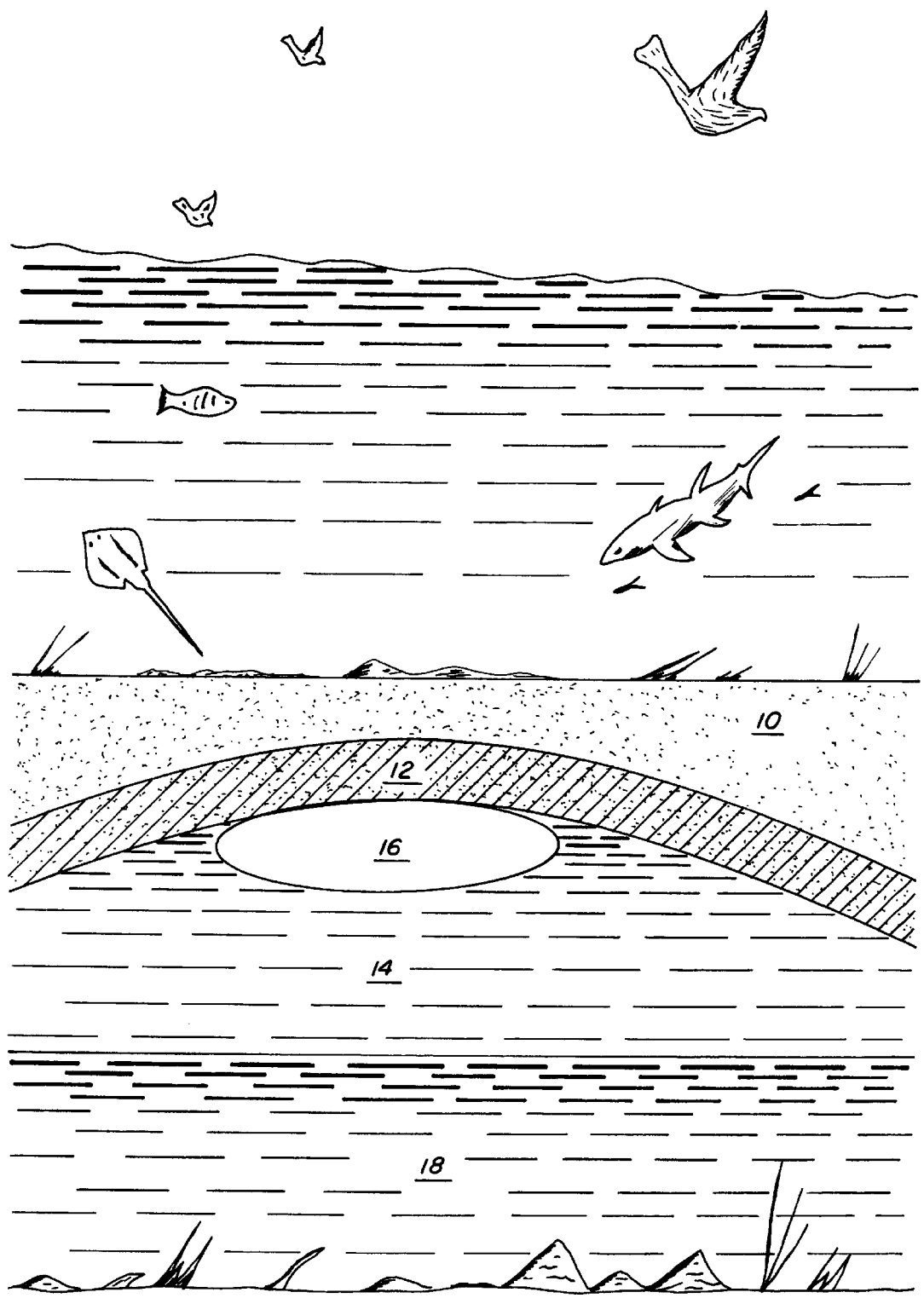
FIG. 1 illustrates a typical undersea oil reservoir.
Figure 2:
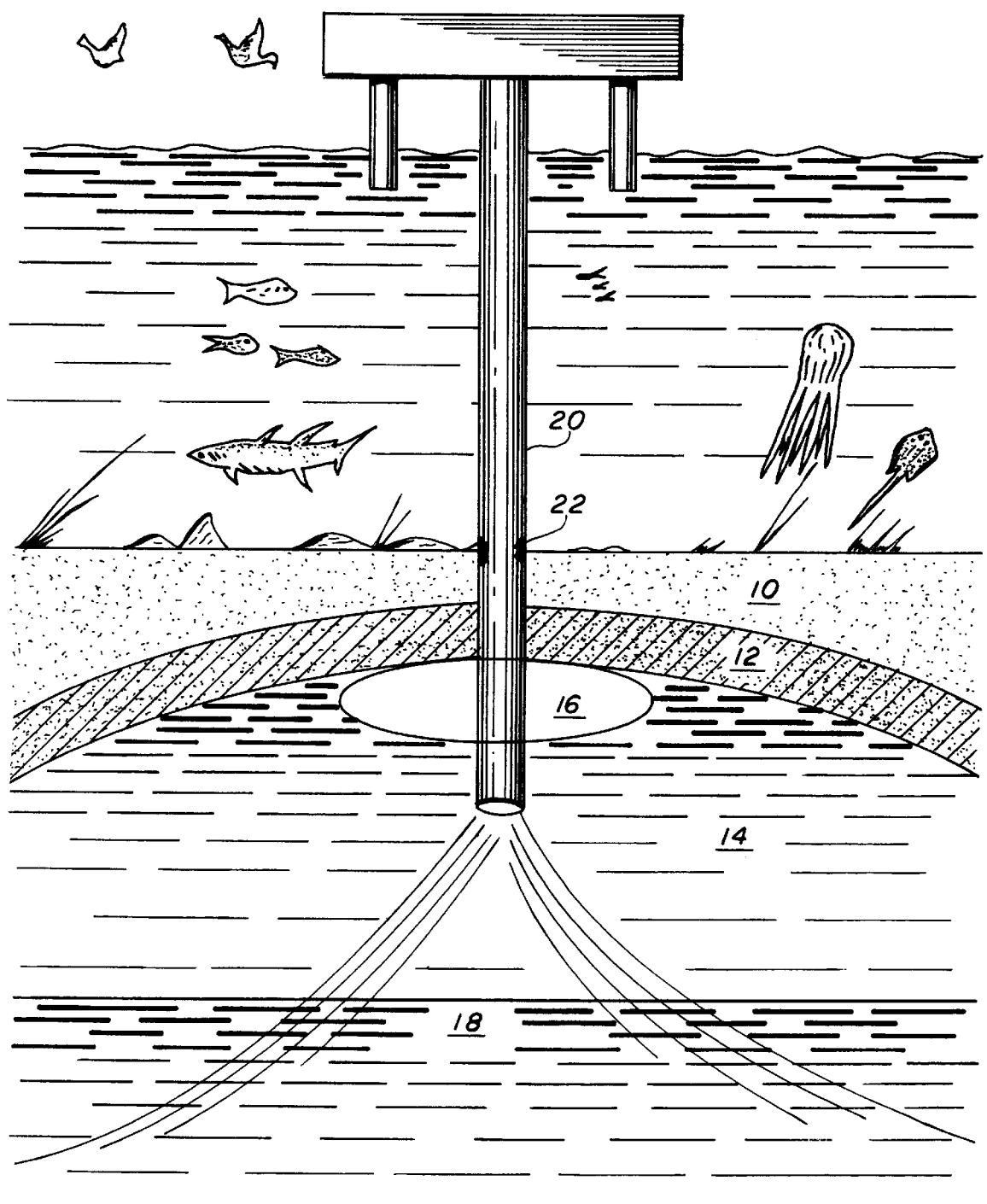
FIG. 2 illustrates a typical undersea oil reservoir after extraction by pumping has taken place for some time.

Tubules for Use in the Present Invention

U.S. Pat. No. 5,651,976, issued Jul. 29, 1997 to Price et al. is hereby incorporated by reference herein, in its entirety, for all purposes.

Adsorption/Desorption Processes

Chemical agents, including the active agents of interest to the present invention, can enter or exit from the internal volume (lumen) of a cylindrical tubule by several mechanisms. For example, active agents can enter or exit tubules by capillary action, if the tubules are sufficiently wide. Capillary attraction and release occurs in tubules having inner diameters of at least about 0.2 $\mu$m. Capillary attraction is relatively weak: agents in tubules having inner diameters of at least about 10 $\mu$m typically will be released in a matter of hours, without the use of other barriers to release.

In contrast to capillary action, adsorption/desorption processes occur over much smaller distance scales, typically on the order of about 1000 Å. Thus, for tubules in this size range, adsorption/desorption is the controlling process for the release of an active agent inside the interior volume of a microtubule. For a molecule of an active agent contained within the interior volume of a microtubule to reach the end of the tubule, so that the molecule can be released into the environment, the molecule must diffuse through the interior of the tubule while repeatedly being adsorbed and then desorbed by the inner surface of the tubule. This process, which may be conceptualized as a chromatography type of process, is much slower than capillary action, by several orders of magnitude.

Mineral Microstructures

Several naturally occurring minerals will, under appropriate hydration conditions, form tubules and other microstructures suitable for use in the present invention. The most common of these is halloysite, an inorganic aluminosilicate belonging to the kaolinite group of clay minerals. See generally, Bates et al., "Morphology and structure of endellite and halloysite", *American Minerologists* 35 463–85 (1950), which remains the definitive paper on halloysite. The mineral has the chemical formula $Al_2O_3.2SiO_2.nH_2O$. In hydrated form the mineral forms good tubules. In dehydrated form the mineral forms broken, collapsed, split, or partially unrolled tubules.

The nomenclature for this mineral is not uniform. In the United States, the hydrated tubule form of the mineral is called endellite, and the dehydrated form is called halloysite. In Europe, the hydrated tubule form of the mineral is called halloysite, and the dehydrated form is called is called meta-halloysite. To avoid confusion, mineralogists will frequently refer to the hydrated mineral as halloysite 10 Å, and the dehydrated mineral as halloysite 7 Å.

Bates et al. present data on the tubes, which is summarized below:

|  | Range (Å) | Median (Å) |
|---|---|---|
| Tube diameter: | 400–1900 | 700 |
| Hole diameter: | 200–1000 | 400 |
| Wall thickness: | 100–700 | 200 |

Tube lengths range from 0.1 to about 0.75 $\mu$m. Morphologically, both hydrated and dehydrated halloysite comprise layers of single silica tetrahedral and alumina octahedral units. They differ in the presence or absence of a layer of water molecules between the silicate and alumina layers. The basal spacing of the dehydrated form is about 7.2 Å, and the basal spacing of the hydrated form is about 10.1 Å (hence the names halloysite 7 Å and halloysite 10 Å). The difference, about 2.9 Å, is about the thickness of a monolayer of water molecules.

A theory for the formation of hollow tubular microcrystals is presented in Bates et al. There is a lattice mismatch between the gibbsite ($Al_2O_3$) and silicate ($SiO_2$) layers. Water molecules interposed between the layers prevents "tetrahedral rotation" in the silicate layer. Halloysite 10 Ådehydrates to halloysite 7 Å at about 110° C. All structural water is lost at about 575° C. The interlayer water in halloysite 10 Å may be replaced by organic liquids such as ethylene glycol, di- and triethylene glycol, and glycerine.

Another mineral that will, under appropriate hydration conditions, form tubules and other. microstructures is imogolite.

Another mineral that will, under appropriate conditions, form tubules and other microstructures is cylindrite. Cylindrite belongs to the class of minerals known as sulfosalts.

Yet another mineral that will, under appropriate conditions, form tubules and other microstructures is boulangerite. Boulangerite also belongs to the class of minerals known as sulfosalts.

Loading Active Agents into Tubules

Methods for Loading Active Agents into Tubules

In preferred embodiments of the invention, an active agent for treating the subsurface well environment is adsorbed onto and within the inner surface of the lumen of a mineral microstructure. Skilled practitioners will be able to employ known techniques for introducing a wide range of active agents into the lumen of a mineral microstructure according to the invention, thereby making a structure for the modulated release of the active agent.

An important aspect of the microstructures is the size of the lumen. Preferred inner diameters range from about 200 Å to about 2000 Å. Preferred lengths range from about 0.1 $\mu$m to several $\mu$m. Lumen size selection is governed in part by the availability of ceramic or inorganic microstructures within the suitable size range. Lumen size selection is also governed by the choice of active agent, and the choice of any carrier, coating, or matrix (see infra). The physical and chemical properties (e.g., viscosity, solubility, reactivity, resistance to wear, etc.) of the active agent, any carrier, any coating and any matrix will be considered by a skilled practitioner. Lumen size selection is also governed by the desired release profile for the active agent.

In another embodiment of the invention, the lumen of the microstructure contains both an active agent and a carrier. This carrier further modulates the release of the active agent from the lumen of the microstructure. The active agent may be soluble or mobile in the carrier. In this case, the release rate of the active agent will depend on the solubility and diffusion rate of the active agent through the carrier and any coating or matrix. The active agent may be insoluble or immobile in the carrier. In this case, the release rate of the active agent will depend on the release rate of the carrier from the tubule, and any coating or matrix.

In another embodiment of the invention, the microstructure is coated with a coating material. This coating further modulates the release of the active agent from the lumen of the microstructure. By carefully selecting a coating for its chemical and physical properties, very precise control of the release of the active agent from the lumen of the microstructure can be achieved.

Typically, exogenous active agent will be removed from the outside of the loaded tubules, to allow unloaded active agent to be recycled and reused (thereby reducing cost), and to improve the uniformity of the release profile. If any active agent left on the outside of the tubules after loading is washed off the tubules, then the tubules will not have this exogenous active agent that would otherwise be delivered very rapidly into the well environment. This release rate would fall off very rapidly, as this exogenous active agent was consumed, and replaced slowly by the active agent loaded in the lumen of the tubules. Accordingly, by removing this exogenous active agent, a more uniform release profile can be achieved.

Active Agents for Treating the Subsurface Well Environment

As noted above, the problems with the subsurface well environment that the present invention addresses include fouling of extraction wells by scale formation, well corrosion, and souring of oil by bacterial contamination. Active agents for preventing or removing scaling, preventing souring, preventing corrosion, and other useful downwell applications are known.

Compositions for preventing and/or removing scaling include the phosphonate compositions disclosed by Pardue et al. (U.S. Pat. No. 5,018,577).

Biocides are used to control unwanted organisms in the well environment. In particular, antibiotics are used against the sulfophilic bacteria responsible for sulfide production that results in product souring and damage to well equipment. Typical antibiotics suitable for use in the present invention include those antibiotics known for use against sulfophilic bacteria in petroleum wells.

Anti-corrosion agents, such as are known in the art can help reduce the amount of maintenance that a production well requires, due to equipment corrosion.

To retard "coning" and assist in the extraction of higher viscosity oil despite the presence of lower viscosity water, surfactants and/or dispersants such as are known in the art can be used in the present invention.

Delivery to the Subsurface Environment

The goal of all delivery methods used for the present invention is to insure delivery of an effective amount of the active agent to the subsurface environment. By effective amount, what is meant is that the active agent is delivered at a concentration within the effective range of that active agent. Below this range, there will not be enough of the active agent in the well to achieve the desired effect. Above this range, no additional effect will be conferred, or the additional benefit conferred will be insufficient to warrant the additional cost of delivery, or undesirable side effects will outweigh the benefit of additional active agent.

Additionally, delivery of the active agent to a concentration within this effective range should be sustained over as long of a time as possible, to reduce the frequency of treatments and thereby reducing the number of times well production must be stopped to carry out the treatment. Currently, loss of well productivity for the time taken up by subsurface treatments is a significant problem in the field.

A number of methods for introducing the loaded tubules into the subsurface environment will be suitable for the present invention, including introduction via either a production well or an injection well. However, it is contemplated by the inventors that subsurface squeeze treatments will be the most common delivery method.

Squeeze treatment is an effective technique for delivering agents into wells. In this technique, production is halted temporarily, and the active agent is pumped down into the well under pressure. Typically, the squeeze pressure is sufficient to deliver the active agent out to a radius of several feet from the pipe opening to a concentration within the effective range. Production may then be restarted.

In this preferred embodiment of the present invention, the loaded tubules are dispersed in a liquid. The liquid may be, depending on the particular application, aqueous (e.g., water or brine), non-aqueous (e.g., diesel fuel or gasoline), or an emulsion or other combination of aqueous and non-aqueous phases. This material is then typically pumped into the well in a squeeze treatment.

Preferably, the tubules are wettable by liquid. In the case of multiphase liquids such as emulsions, the tubules are wettable preferably by at least one, more preferably by all of the phases in the liquid.

Since the tubules of the invention are sturdy enough to survive this pumping process (that is, there is not so much breakage or other failure: of the tubules to frustrate the controlled release goals of the invention). Moreover, the tubules are sturdy enough to survive the well environment, for at least a time sufficient to achieve the controlled release goals of the invention. This latter point is important because the oil well environment is so unfriendly (due to the high ambient pressure and temperature, and the caustic chemical nature of the well).

Quantifying the survivability of the tubules used in the invention can be done a number of ways, including (a) measuring the change in the median length of the tubules, (b) measuring the fraction of damaged tubules, and (c) measuring the release rate of materials encapsulated in the tubules. The tubules of the invention, including the aforementioned mineral tubules, are sufficiently robust to achieve the goals of the invention. The tubules of the invention can achieve controlled release over several months (e.g., over six months or more) after pumping into the well environment. Tubules that satisfy one or more of these figures of merit to an acceptable degree (e.g., not more that one third of the tubules damaged, not more than 20% loss of median length, controlled release over at least six months) may be said to be "pumpable" according to the present invention.

In an alternative embodiment of the invention, delivery of the loaded tubules would be effected by delivering a consolidated mass of loaded tubules into the well. In this embodiment of the invention, a mass of tubules is compacted into a consolidated mass, typically with a binder. The consolidated mass may be in any desired shape: sphere, cylinder, polyhedron, puck, etc. Suitable binders include polymers (e.g., vinyls, acrylates, urethanes, polysaccharides such as cellulose, etc.), adhesives, ceramics, and other known binders. One or more of these consolidated bodies (pills) are then delivered into the well, e.g, through the delivery well bore. This embodiment provides a preferred, compact way to retain and deliver concentrated active agents within the well. Proper selection of the binder material can further modulate the release rate of the active agent into the ambient well environment. By carefully selecting a binder for its chemical and physical properties, very precise control of the release of the active agent from the lumen of the microstructure can be achieved.

For example, a thermoset polymer may be used as a binder in a preferred embodiment of the invention. By carefully selecting the degree of crosslinking in a thermoset polymer binder, and thus the porosity of the thermoset polymer binder, one can obtain a precise degree of control over the release of the active agent from the lumen of the microstructure. Highly crosslinked thermoset binders will retard the release of the active agent from the lumen more effectively than less crosslinked thermoset binders.

Likewise, the chemical properties of a binder may be used to modulate the release of an active agent from the lumen of a microstructure. For example, it may be desired to use a hydrophobic active agent in an aqueous use environment. However, if one were to load a highly hydrophobic active agent into the lumen of a microstructure according to the invention, and then place this loaded microstructure in an aqueous use environment, the active agent typically would release into the use environment unacceptably slowly, if at all.

An additional advantage of this embodiment of the invention is the ease with which a desired dose of the active agent can be delivered. As with the oral delivery of pharmaceuticals in pill form, the dosage decision is made, in part, in the manufacturing process, limiting the field decision to how many and/or what size pill to deliver. Typically, pills will be manufactured so that a single pill delivers an effective dose of the active agent(s).

If treatment with multiple active agents is desired, pills with multiple active agents may be made, or alternatively pills with a single active agent may be made, and the field decision includes the appropriate selection of a combination of pills.

The pills described above are also useful for applications other than delivery into wells. Delivery into transport and storage vessels for petroleum and petroleum products, such as the well bore, or in a storage container or transfer pipeline.

It is preferable that the tubules used in the invention be wettable in the subsurface environment. Treating the tubules to improve their wettability, while not generally required for the invention, may be useful for certain particular applications. The wettability of the tubules in the subsurface environment, and their concomitant dispersability in the subsurface environment, allows for the introduction of active agents for treating the subsurface environment that are immiscible in that environment. If these immiscible agents were simply injected into the subsurface environment, they would not tend to mix well with that environment, and the distribution of the active agent through the treated volume would be sub-optimal. The wettable tubules of the invention obviate that problem, allowing better distribution of immiscible active agents through the treatment volume. Accordingly, the present invention should open up the ability to use active agents in particular subsurface environments that previously were not used due to immiscibility.

Obviously, many modifications and variations of the present invention are possible in light of the above teachings. It is therefore to be understood that, within the scope of the appended claims, the invention may be practiced otherwise than as specifically described.

What is claimed is:

1. A method for delivering encapsulated materials to a subsurface environment for the treatment of said subsurface environment, comprising the steps of:

loading lumen of hollow, cylindrical, inorganic, mineral microtubules with an active agent selected for treating a subsurface environment, wherein said hollow, cylindrical, inorganic, mineral microtubules are compatible with said subsurface environment; and administering said hollow, cylindrical, inorganic, mineral microtubules to said subsurface environment, thereby permitting the controlled release of said active agent into said subsurface environment.

2. The method of claim 1, wherein said hollow, cylindrical, microtubules are mineral microtubules.

3. The method of claim 2, wherein said hollow, cylindrical, mineral microtubules are selected from the group consisting of halloycite, cylindrite, boulangerite, and imogolite.

4. The method of claim 1, wherein said hollow, cylindrical, microtubules are pumpable microtubules.

5. The method of claim 1, wherein said active agent is selected from the known materials used for treating underground wells.

6. The method of claim 1, wherein said active agent is selected from the group consisting of biocides agents, antiscale, anticorrosion agents and combinations thereof.

7. The method of claim 6, wherein said active agent is immiscible in at least a region of said subsurface environment where said active agent is to delivered.

8. The method of claim 1, wherein said hollow, cylindrical, microtubules are dispersed in a liquid.

9. The method of claim 7, wherein said liquid is selected from the group consisting of aqueous liquids and non-aqueous liquids.

10. The method of claim 9, wherein said aqueous liquid is a surfactant and said non-aqueous liquid is diesel oil.

11. The method of claim 1, wherein, upon administration into said subsurface environment, said hollow, cylindrical, microtubules are dispersable in said subsurface environment.

12. The method of claim 11, wherein said subsurface environment is an oil saturated permeable stratum a well bore.

13. The method of claim 11, wherein said subsurface environment is a water saturated permeable stratum.

14. The method of claim 11, wherein said subsurface environment is a hydrocarbon reservoir.

15. The method of claim 11, wherein said administering said hollow, cylindrical, inorganic microtubules to said subsurface environment is through an injection well.

16. The method of claim 11, wherein said administering said hollow, cylindrical, inorganic microtubules to said subsurface environment is through a production well.

17. The method of claim 1, further comprising the step:

consolidating said tubules into a pill adapted for delivery into the subsurface environment.

18. The method of claim 17, wherein said pill further comprises a binder, for binding said tubules in said pill.

19. The method of claim 17, wherein said administering step comprises delivering said pill into a well bore.

* * * * *